United States Patent
Won et al.

(10) Patent No.: US 9,034,207 B2
(45) Date of Patent: May 19, 2015

(54) PHOSPHOR, MANUFACTURING METHOD OF PHOSPHOR AND LIGHT EMITTING DEVICE INCLUDING THE SAME

(71) Applicant: SAMSUNG ELECTRONICS CO., LTD., Gyeonggi-do (KR)

(72) Inventors: Hyong Sik Won, Gyeonggi-do (KR); Chan Suk Min, Gyeonggi-do (KR); Seong Min Kim, Chungcheonnam-do (KR); Sung Hak Jo, Gyeongsangbuk-do (KR); Youn Gon Park, Gyeonggi-do (KR); Chul Soo Yoon, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 265 days.

(21) Appl. No.: 13/711,063

(22) Filed: Dec. 11, 2012

(65) Prior Publication Data

US 2013/0147344 A1    Jun. 13, 2013

(30) Foreign Application Priority Data

Dec. 12, 2011  (KR) .......................... 10-2011-0132881

(51) Int. Cl.
*H01L 33/50* (2010.01)
*C09K 11/59* (2006.01)
*C09K 11/77* (2006.01)
*H05B 33/14* (2006.01)

(52) U.S. Cl.
CPC ............ *C09K 11/7792* (2013.01); *H05B 33/14* (2013.01)

(58) Field of Classification Search
USPC ....................... 252/301.4 F; 313/503; 257/98
See application file for complete search history.

(56) References Cited

U.S. PATENT DOCUMENTS 8,398,890 B2 *  3/2013  Seto et al. ............... 252/301.4 F
8,574,459 B2 * 11/2013  Seto et al. ............... 252/301.4 F

FOREIGN PATENT DOCUMENTS

JP  2010-095728 A  4/2010
KR  10-2011-0011586 A  2/2011

* cited by examiner

*Primary Examiner* — Carol M Koslow
(74) *Attorney, Agent, or Firm* — McDermott Will & Emery LLP

(57) ABSTRACT

A phosphor is represented by a general Formula: $Eu_xM_yL_{3-x-y}Si_{6-z}Al_zN_{11-(z+y+z)}O_{(z+y+z)}$ and satisfies $0.00001 \leq x \leq 2.9999$, $0.0001 \leq y \leq 2.99999$ and $0 \leq z \leq 6.0$. L is at least one element selected from La, Y, Gd and Lu. M is at least one element selected from Ca, Sr, Ba and Mn.

20 Claims, 4 Drawing Sheets

PHOSPHOR, MANUFACTURING METHOD OF PHOSPHOR AND LIGHT EMITTING DEVICE INCLUDING THE SAME

CROSS-REFERENCE TO RELATED APPLICATION

This application claims benefit of priority to Korean Patent Application No. 10-2011-0132881 filed on Dec. 12, 2011, in the Korean Intellectual Property Office, the entire contents of which are hereby incorporated by reference.

TECHNICAL FIELD

The present inventive concept relates to a phosphor, a manufacturing method of a phosphor and a light emitting device including the same.

BACKGROUND

In general, a white light emitting diode (LED) recently prominent due to the use in lighting devices, LCD backlights, automobile lighting devices, and the like, includes an LED emitting blue or near ultraviolet light and as an excitation source, a phosphor converting a wavelength of the light emitted from the LED into visible light.

A representative method of implementing the white LED includes employing a blue light emitting diode formed of an InGaN-based material having a wavelength of 450 to 550 nm as a light emitting element and employing a YAG-based phosphor emitting yellow light and represented by a compositional Formula of $(Y,Gd)_3(Al,Ga)_5O_{12}$ as a phosphor. In the white LED, blue light emitted from the light emitting element is incident onto a phosphor layer and repeatedly absorbed and scattered within the phosphor layer. Yellow light formed by wavelength converted blue light and a portion of the incident blue light are mixed, such that the blue light absorbed in the phosphor through the repeated process may appear to human eyes as white light. However, oxide-based phosphors such as silicate or the like generally tend to be degraded in luminous intensity when a wavelength of an excitation source is above 400 nm, and accordingly are not appropriate for implementing white light having high brightness using blue light. Garnet based phosphors which is represented by YAG have excellent excitation efficiency and luminous efficiency in blue light but tend to be degraded in luminous efficiency at high temperature.

In recent years, nitride based phosphors, so-called LSN phosphors having a compositional Formula of $La_3Si_6N_{11}$ have been reported and appreciated as having superior high temperature characteristics and reliability. However, LSN phosphors may provide yellow phosphors having a broad emission bandwidth and high luminous efficiency, but have low luminous efficiency in a wavelength band of about 550 nm or more.

SUMMARY

An aspect of the present inventive concept relates to a phosphor having excellent high temperature characteristics and reliability and improved luminous efficiency in a long wavelength as compared to the case of an LSN phosphor of the related art.

An aspect of the present inventive concept also encompasses a light emitting device including the phosphor.

An aspect of the present inventive concept also encompasses a method of efficiently manufacturing the phosphor.

An aspect of the present inventive concept relates to a phosphor respesented by a general Formula: $Eu_xM_yL_{3-x-y}Si_{6-z}Al_zN_{11-(z+y+z)}O_{z+y+z}$ and satisfying $0.00001 \leq x \leq 2.9999$, $0.0001 \leq y \leq 2.99999$ and $0 \leq z \leq 6.0$. L is at least one element selected from La, Y, Gd and Lu, and M is at least one element selected Ca, Sr, Ba and Mn.

In the general Formula, $0.00001 \leq x \leq 0.5$ may be satisfied.
In the general Formula, $0.0001 \leq y \leq 1.0$ may be satisfied.
In the general Formula, $0 \leq z \leq 0.5$ may be satisfied.

The phosphor may have a wavelength of 550 nm or more in a center of an emission spectrum when ultraviolet light or blue light is used as an excitation source.

The phosphor may have a crystal structure the same as a crystal structure of a phosphor represented by $La_3Si_6N_{11}$.

M may be partially substituted with Eu in $Eu^{2+}$ form.

Another aspect of the present inventive concept relates to a manufacturing method of a phosphor. According to the manufacturing method, an Si raw material is prepared. An M raw material is prepared. An L raw material is prepared. An Eu raw material is prepared. The Si raw material, the M raw material, the L raw material, and the Eu raw material are synthesized to form a material represented by a general Formula: $Eu_xM_yL_{3-x-y}Si_{6-z}Al_zN_{11-(z+y+z)}O_{(z+y+z)}$ and satisfying $0.00001 \leq x \leq 2.9999$, $0.0001 \leq y \leq 2.99999$ and $0 \leq z \leq 6.0$. L is at least one element selected from La, Y, Gd and Lu, and M is at least one element selected from Ca, Sr, Ba and Mn.

In the synthesizing of the Si raw material, the M raw material, the L raw material, and the Eu raw material, the Si raw material, the M raw material, and the Eu raw material are synthesized to form a precursor. The precursor and the Si raw material, the M raw material, the L raw material, and the Eu raw material are then synthesized.

The precursor may have a composition Formula of $Eu_xM_{2-x}Si_5N_8$.

In the general Formula, $0.00001 \leq x \leq 0.5$ may be satisfied.
In the general Formula, $0.0001 \leq y \leq 1.0$ may be satisfied.
In the general Formula, $0 \leq z \leq 0.5$ may be satisfied.

The Si raw material may be $Si_3N_4$, the L raw material may be LaN, and the M raw material may be $Ca_3N_2$.

Still another aspect of the present inventive concept relates to a light emitting device including: a light emitting element configured to emit exitation light, and a wavelength converting unit configured to absorb the exitation light and emit visible light. The wavelength converting unit is represented by a general Formula: $Eu_xM_yL_{3-x-y}Si_{6-z}Al_zN_{11-(z+y+z)}O_{(z+y+z)}$ and satisfies $0.00001 \leq x \leq 2.9999$, $0.0001 \leq y \leq 2.99999$ and $0 \leq z \leq 6.0$. L is at least one element selected from La, Y, Gd and Lu. M is at least one element selected from Ca, Sr, Ba and Mn.

The light emitting device may be an ultraviolet light emitting diode or a blue light emitting diode.

In the general Formula, $0.00001 \leq x \leq 0.5$ may be satisfied.
In the general Formula, $0.0001 \leq y \leq 1.0$ may be satisfied.
In the general Formula, $0 \leq z \leq 0.5$ may be satisfied.

BRIEF DESCRIPTION OF THE DRAWINGS

The foregoing and other features of the inventive concept will be apparent from more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept. In the drawings, the thickness of layers and regions may be exaggerated for clarity.

DETAILED DESCRIPTION

Figure 1:
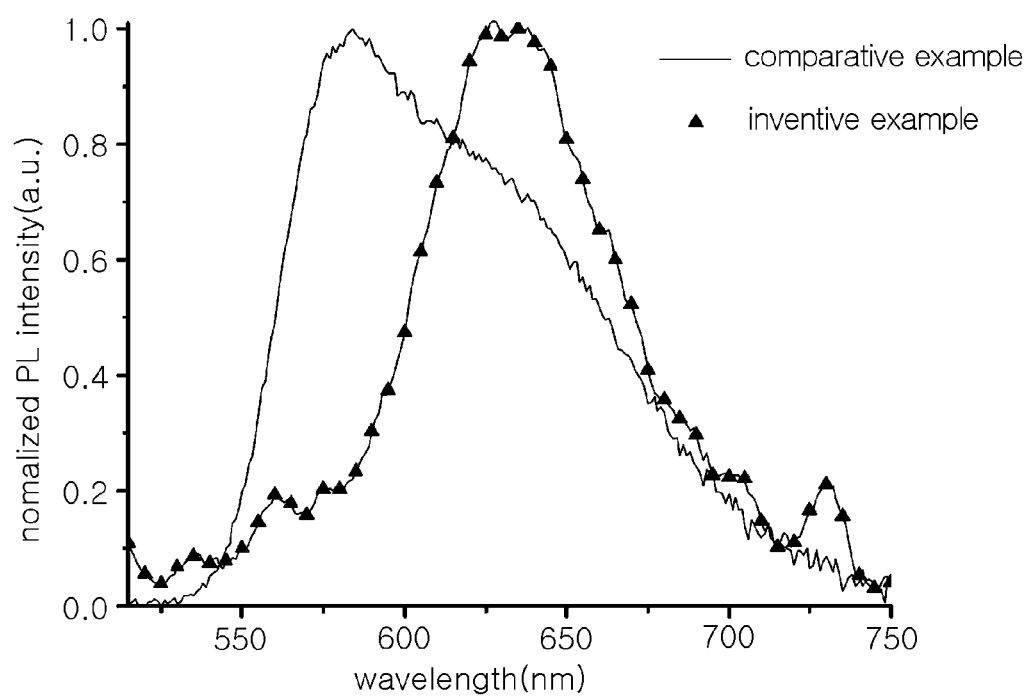
FIG. 1 is a diagram illustrating emission spectra of phosphors according to an Inventive Example of the present application and a Comparative Example.

Examples of the present inventive concept will be described below in more detail with reference to the accompanying drawings. The examples of the present inventive concept may, however, be embodied indifferent forms and should not be construed as limited to the examples set forth herein. Like reference numerals may refer to like elements throughout the specification.

A phosphor according to an embodiment of the present inventive concept is represented by Formula: $Eu_xM_yL_{3-x-y}Si_{6-z}Al_zN_{11-(z+y+z)}O_{(z+y+z)}$ and satisfies $0.00001 \leq x \leq 2.9999$, $0.0001 \leq y \leq 2.99999$ and $0 \leq z \leq 6.0$, where L is at least one element selected from La, Y, Gd and Lu, and M is at least one element selected from Ca, Sr, Ba and Mn. The phosphor is a material formed by modifying an LSN phosphor represented by $La_3Si_6N_{11}$. In this case, some elements of the LSN phosphor are substituted and $Eu^{2+}$ is used as an active agent.

It is confirmed that the phosphor according to an embodiment of the present inventive concept has excellent luminous efficiency in a long wavelength and a narrow emission bandwidth as compared to those of an LSN phosphor of the related art, and a detailed description thereof will be described below. When ultraviolet light or visible light is irradiated as an excitation source, the phosphor may exhibit excellent efficiency and reliability in a yellow band, an orange band, or other bands adjacent thereto, such that the phosphor may serve as a wavelength converting unit and be appropriately used as a phosphor for a light emitting element such as a light emitting diode or the like. For example, the phosphor may have a wavelength of 550 nm or more in the center of an emission spectrum when ultraviolet light or blue light is used as an excitation source. By using the light emitting element and a phosphor composition, a light emitting device, in particular, a light emitting device capable of emitting white light, may be implemented. In this case, the light emitting device may include a light emitting device package, a backlight unit, a lighting device and the like. The phosphor may be used in the light emitting device to improve color rendering properties, color reproducibility and the like.

The composition of the phosphor will be described in detail. As compared to an LSN phosphor of the related art, the phosphor according to an embodiment may further include an element such as Ca, Sr, Ba, Mn or the like and may have a structure in which a group II element site is substituted with a divalent Eu. That is, the LSN phosphor of the related art has a structure in which a La site is substituted with Ce to cause $Ce^{3+}$ emission, and the structure may allow for high efficiency in a wavelength band of 530 to 550 nm, but low efficiency in a wavelength band higher than 550 nm. In addition, when Eu is added as an active agent in the LSN phosphor, instead of Ce, $Eu^{3+}$ emissions may hinder high luminous efficiency from being obtained.

In an embodiment of the present inventive concept, a group II element such as Ca, Sr, Ba, Mn or the like is added to the LSN phosphor in order to allow for divalent Eu emissions and a group II element site is substituted with a divalent Eu to cause $Eu^{2+}$ emissions. In this case, a material such as $Eu_xM_{2-x}Si_5N_8$ is used as a precursor, such that a host material of the LSN phosphor may be stably substituted with a divalent Eu, and a description thereof will be provided below.

Meanwhile, in the general Formula of the phosphor according to an embodiment of the present inventive concept, more preferable composition conditions are as below:

$0.00001 \leq x \leq 0.5$ (1)

$0.0001 \leq y \leq 1.0$ (2)

$0 \leq z \leq 0.5$ (3)

A phosphor having the above-mentioned composition is manufactured by the inventor(s) of the present inventive concept and luminescence properties thereof were compared with those of the LSN phosphor of the related art. In the LSN phosphor according to the related art, raw materials were weighed and mixed as below.

TABLE 1

| LaN | $Si_3N_4$ | CeN | $BaF_2$ | Total Weight (g) |
|---|---|---|---|---|
| 0.6049 | 0.3794 | 0.0156 | 0.0100 | 1.01 |

In the phosphor according to the Inventive Example of the present application, raw materials were weighed as below and in this case, a precursor was $Eu_xCa_{2-x}Si_5N_8$.

TABLE 2

| LaN | $Si_3N_4$ | $Ca_3N_2$ | AlN | Precursor | $BaF_2$ | Total Weight(g) |
|---|---|---|---|---|---|---|
| 0.5612 | 0.3741 | 0.0290 | 0.0181 | 0.0176 | 0.0100 | 1.01 |

Figure 2:
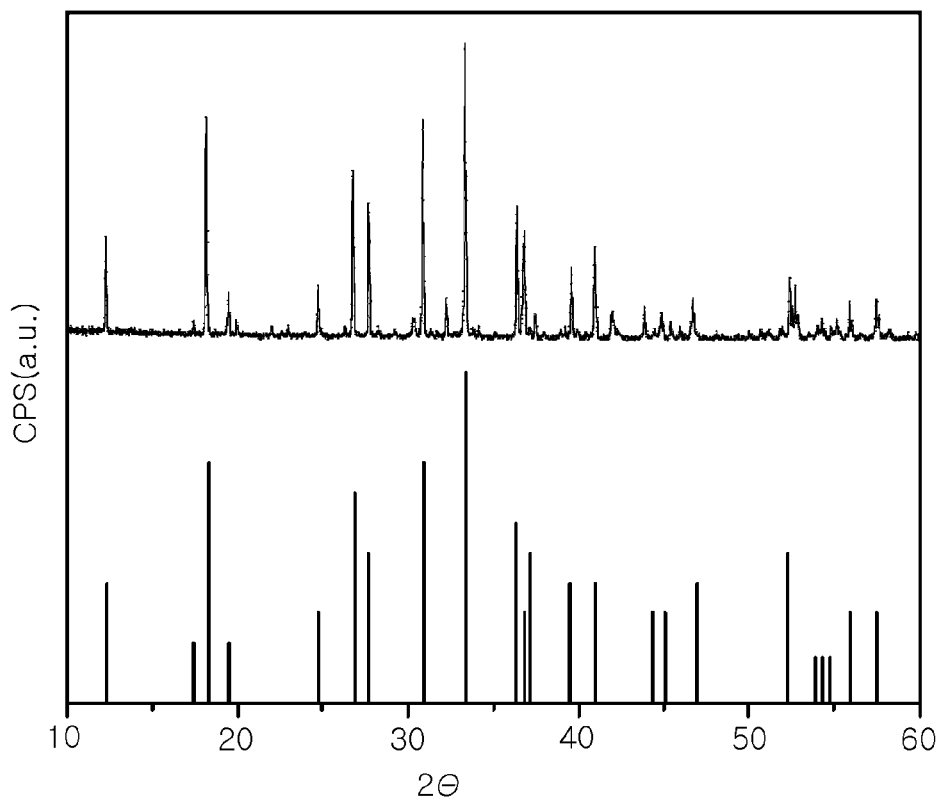
FIG. 2 is a diagram illustrating a result of comparing XRD patterns of the phosphor according to the Inventive Example of the present application and an LSN phosphor.
Figure 3:
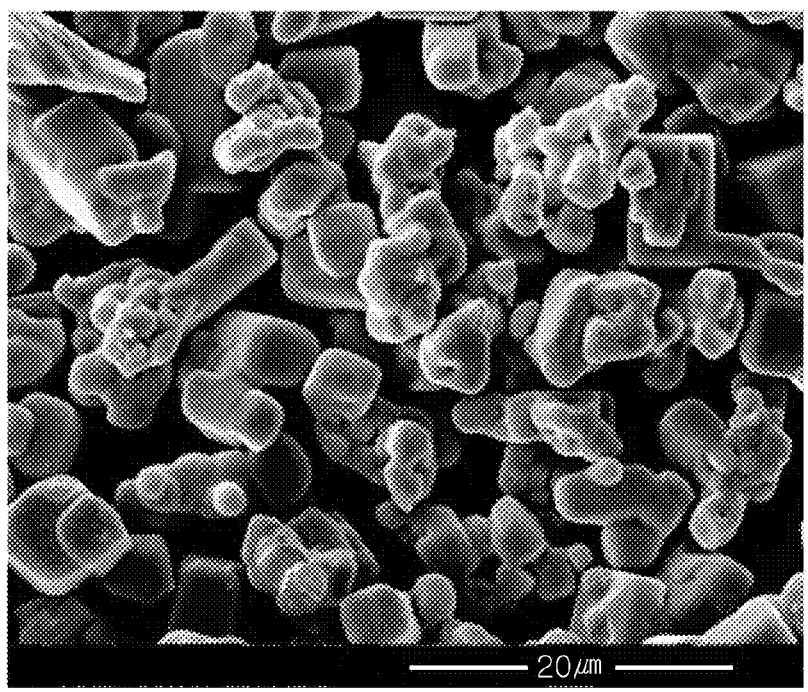
FIGS. 3 and 4 respectively illustrate a SEM photograph of the phosphor according to the Inventive Example of the present application and an element analysis result thereof using EDS (Energy dispersive spectroscopy).
Figure 4:
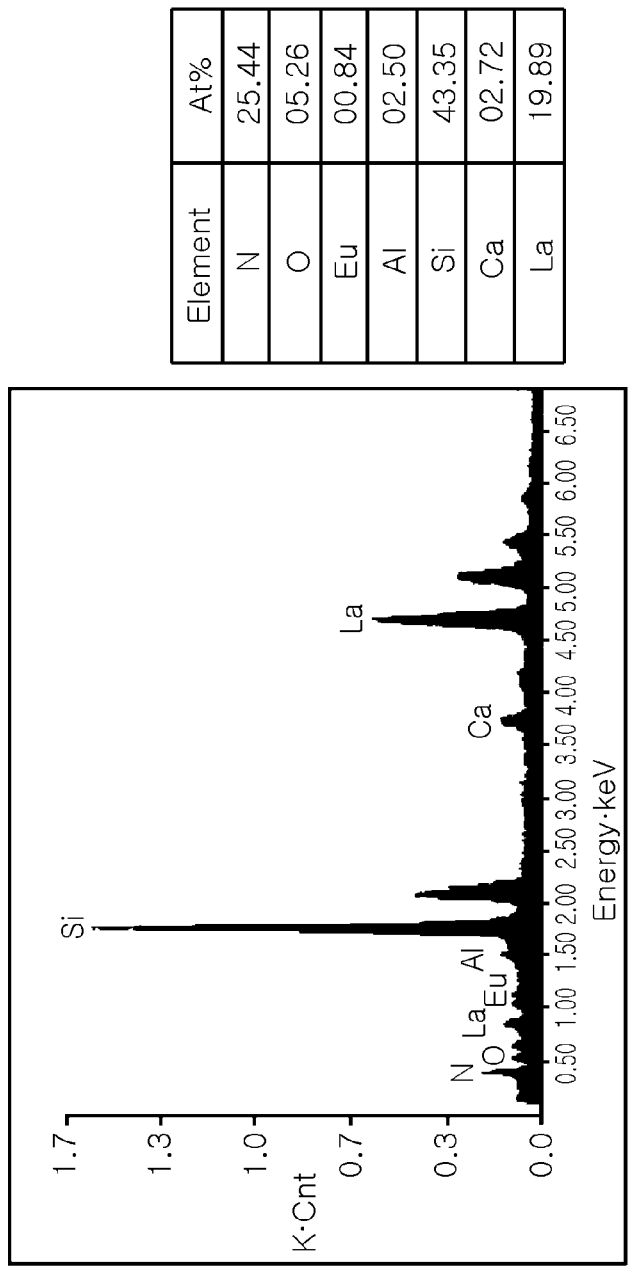

FIG. 1 is a diagram illustrating emission spectra of phosphors according to an Inventive Example of the present application and a Comparative Example, and in this case, visible light of 450 nm was used as a light source. FIG. 2 is a diagram illustrating a comparing result of XRD patterns of the phosphor according to the Inventive Example of the present application and an LSN phosphor; and FIGS. 3 and 4 respectively illustrate a SEM photograph of the phosphor according to the Inventive Example of the present application and an element analysis result thereof using EDS (Energy dispersive spectroscopy).

First, according to the emission spectra of FIG. 1, is confirmed that emission occurred in a relatively long wavelength and an emission bandwidth was about 56 nm, narrower as compared to the case of the Comparative Example (about 582 nm) in which $Ce^{3+}$ emissions occurred. This can be understood because $Eu^{3+}$ emissions occurred in the phosphor according to the Inventive Example of the present application.

In addition, according to XRD patterns of FIG. 2, it is confirmed that the Inventive Example (Upper part) has a crystal structure substantially the same as that of $La_3Si_6N_{11}$ illustrated in a lower part of FIG. 2, that is, a hexagonal crystal structure. In this manner, in the case of the phosphor according to the Inventive Example of the present application, excellent efficiency is exhibited in a relatively long wavelength through an addition of a divalent element such as Ca or the like and Eu, while a basic crystal structure of an LSN phosphor is maintained.

Meanwhile, according to an example of a manufacturing method of the phosphor having the above-mentioned composition, in order to synthesize a phosphor represented by a general Formula $Eu_xM_yL_{3-x-y}Si_{6-z}Al_zN_{11-(z+y+z)}O_{(z+y+z)}$, a Si raw material, an M raw material, an L raw material, and an Eu raw material were prepared. In the case of Al, a raw material such as AlN or the like may be added as necessary. As examples of the raw materials, the Si raw material may be $Si_3N_4$; the M raw material may be $Ca_3N_2$; the L raw material may be LaN; and the Eu raw material may be $Eu_2O_3$. The raw materials were weighed and then mixed through a manual operation or the use of a motor mortar. When the raw materials were mixed, the raw materials were weighed and mixed in an Ar gas-substituted globe box in order to reduce effects due to oxygen or water. It is not necessarily required, but $BaF_2$ was used as a flux agent in order to accelerate the synthesis of the phosphor.

The phosphor having the above-composition may be obtained by simultaneously mixing the raw materials. However, a precursor may be used to obtain a composition in which Eu is effectively substituted in a divalent form. Specifically, in the case in which Ca is provided as a group II element, $Ca_3N_2$, $Eu_2O_3$ and $Si_3N_4$ were weighed and mixed to obtain a precursor and a composition of the precursor is as below, by way of example.

TABLE 3

| $Si_3N_4$ | $Ca_3N_2$ | $Eu_2O_3$ | Total Weight (g) |
|---|---|---|---|
| 0.572 | 0.169 | 0.258 | 1.00 |

The mixture was synthesized at about 1600° C. for about five hours under an $H_2/N_2$ mixed gas atmosphere to obtain a precursor having a composition of $Eu_xCa_{2-x}Si_5N_8$.

Thereafter, the raw materials and the obtained precursor were mixed as shown in the composition table and a mixture obtained thereby was synthesized at about 1600° C. for about ten hours under an $H_2/N_2$ mixed gas atmosphere to obtain a phosphor having the above-mentioned composition Formula. In this manner, in an embodiment of the present inventive concept, a group II element and a precursor having a divalent Eu with which the group II element is substituted are used, whereby a phosphor composition in which a host material of the LSN phosphor may be effectively substituted with a divalent Eu.

As set forth above, according to embodiments of the inventive concept, a phosphor having excellent high temperature characteristics and reliability and improved luminous efficiency in a long wavelength as compared to the case of an LSN phosphor of the related art can be provided. A light emitting device including the phosphor can be provided.

In addition, a method of efficiently manufacturing the phosphor can be provided.

Although a few exemplary embodiments of the present inventive concept have been shown and described, the present inventive concept is not limited to the described exemplary embodiments. Instead, it would be appreciated by those skilled in the art that changes may be made to these exemplary embodiments without departing from the principles and spirit of the inventive concept, the scope of which is defined by the appended claims and their equivalents.

What is claimed is:

1. A phosphor, represented by a general Formula: $Eu_xM_yL_{3-x-y}Si_{6-z}Al_zN_{11-(z+y+z)}O_{(z+y+z)}$ and satisfying $0.00001 \leq x \leq 2.9999$, $0.0001 \leq y \leq 2.99999$ and $0 \leq z \leq 6.0$, where:

L is at least one element selected from the group consisting of La, Y, Gd and Lu, and M is at least one element selected from the group consisting of Ca, Sr, Ba and Mn.

2. The phosphor of claim 1, wherein in the general Formula, $0.00001 \leq x \leq 0.5$ is satisfied.

3. The phosphor of claim 1, wherein in the general Formula, $0.0001 \leq y \leq 1.0$ is satisfied.

4. The phosphor of claim 1, wherein in the general Formula, $0 \leq z \leq 0.5$ is satisfied.

5. The phosphor of claim 1, wherein the phosphor has a wavelength of 550 nm or more in a center of an emission spectrum when ultraviolet light or blue light is used as an excitation source.

6. The phosphor of claim 1, wherein the phosphor has a crystal structure the same as a crystal structure of a phosphor represented by $La_3Si_6N_{11}$.

7. The phosphor of claim 1, wherein M is partially substituted with Eu in $Eu^{2+}$ form.

8. A manufacturing method of a phosphor, comprising steps of:

mixing an Si raw material, an M raw material, an L raw material, and an Eu raw material to form a mixture; and synthesizing, using the mixture under a controlled $H_2/N_2$ gas atmosphere at about 1600° C. for about ten hours, the phosphor represented by a general Formula: $EU_xM_yL_{3-x-y}Si_{6-z}Al_zN_{11-(z+y+z)}O_{(z+y+z)}$ and satisfying $0.00001 \leq x \leq 2.9999$, $0.0001 \leq y \leq 2.99999$ and $0 \leq z \leq 6.0$, where:

L is at least one element selected from the group consisting of La, Y, Gd and Lu, and M is at least one element selected from the group consisting of Ca, Sr, Ba and Mn.

9. The manufacturing method of claim 8, wherein the step of mixing the Si raw material, the M raw material, the L raw material, and the Eu raw material includes the steps of:

mixing the Si raw material, the M raw material, and the Eu raw material to form a precursor; and mixing the precursor and the Si raw material, the M raw material, the L raw material, and the Eu raw material to form the mixture.

10. The manufacturing method of claim 9, wherein the precursor has a composition Formula of $Eu_xM_{2-x}Si_5N_8$.

11. The manufacturing method of claim 8, wherein in the general Formula, $0.00001 \leq x \leq 0.5$ is satisfied.

12. The manufacturing method of claim 8, wherein in the general Formula, $0.0001 \leq y \leq 1.0$ is satisfied.

13. The manufacturing method of claim 8, wherein in the general Formula, $0 \leq z \leq 0.5$ is satisfied.

14. The manufacturing method of claim 8, wherein:

the Si raw material is $Si_3N_4$, the L raw material is LaN, and the M raw material is $Ca_3N_2$.

15. A light emitting device, comprising:

a light emitting element configured to emit excitation light; and a wavelength converting unit configured to absorb the excitation light and emit visible light, wherein the wavelength converting unit includes a material represented by a general Formula: $Eu_xM_yL_{3-x-y}Si_{6-z}Al_zN_{11-(z+y+z)}O_{(z+y+z)}$ and satisfying $0.00001 \leq x \leq 2.9999$, $0.0001 \leq y \leq 2.99999$ and $0 \leq z \leq 6.0$, where:

L is at least one element selected from the group consisting of La, Y, Gd and Lu, and M is at least one element selected from the group consisting of Ca, Sr, Ba and Mn.

16. The light emitting device of claim 15, wherein the light emitting device is an ultraviolet light emitting diode or a blue light emitting diode.

17. The light emitting device of claim 15, wherein in the general Formula, $0.00001 \leq x \leq 0.5$ is satisfied.

18. The light emitting device of claim 15, wherein in the general Formula, $0.0001 \leq y \leq 1.0$ is satisfied.

19. The light emitting device of claim 15, wherein in the general Formula, $0 \leq z \leq 0.5$ is satisfied.

20. The manufacturing method of claim 9,
wherein M includes Ca, and
wherein the step of mixing the Si raw material, the M raw material including Ca, and the Eu raw material is performed under a controlled $H_2/N_2$ gas atmosphere at about 1600°C. for about five hours to form the precursor having a composition of $Eu_xCa_{2-x}Si_5N_8$.

* * * * *